April 26, 1938.  H. R. FUEHRER  2,115,516
FLUID PRESSURE BRAKE
Filed June 30, 1936
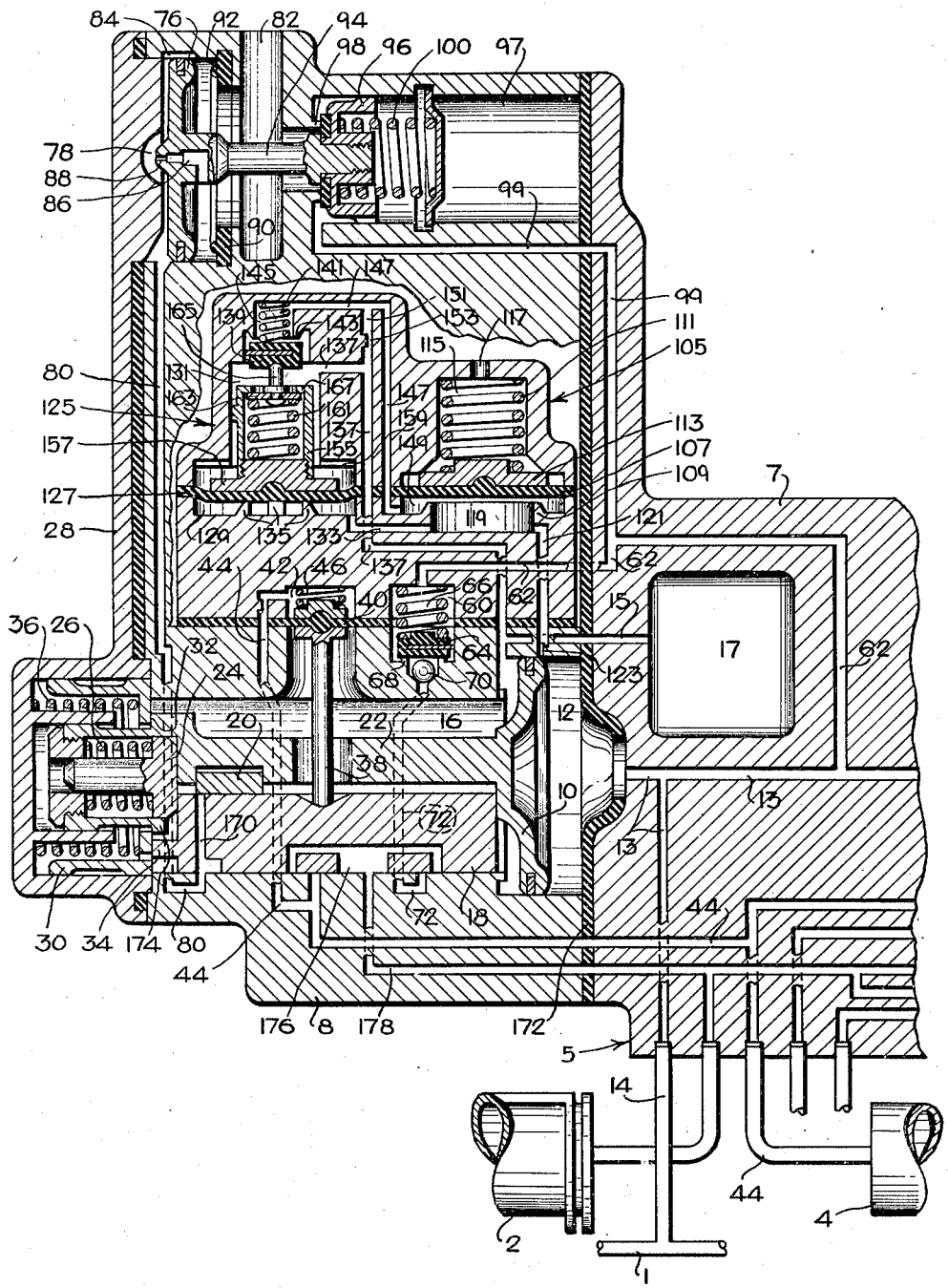
INVENTOR
HERBERT R. FUEHRER
BY Wm. M. Cady
ATTORNEY Patented Apr. 26, 1938

2,115,516

UNITED STATES PATENT OFFICE 2,115,516

FLUID PRESSURE BRAKE

Herbert R. Fuehrer, McKeesport, Pa., assignor to The Westinghouse Air Brake Company, Wilmerding, Pa., a corporation of Pennsylvania Application June 30, 1936, Serial No. 88,075

21 Claims. (Cl. 303—46)

This invention relates to a fluid pressure brake and more particularly to an improvement in the brake controlling valve device shown in the copending application, Serial No. 67,274, of Ellery R. Fitch, filed March 5, 1936.

The brake controlling valve device shown in the above identified application comprises a movable abutment subject to the opposing pressures of the fluid in the brake pipe and of the fluid in a pressure chamber and valve means operable by said abutment for controlling emergency applications of the brakes, and for controlling a passage through which fluid under pressure may be supplied from the brake cylinder to the brake pipe. This movable abutment also controls a communication through which fluid under pressure may flow from the pressure chamber to the brake pipe at a rate which will permit the pressure of the fluid in the pressure chamber to reduce substantially as rapidly as the pressure of the fluid in the brake pipe is reduced on a reduction in brake pipe pressure at a service rate to thereby prevent the development of sufficient differential between the pressures in the pressure chamber and in the brake pipe to cause the movable abutment to be moved to a position in which the emergency valve device is operative to effect the venting of fluid under pressure from the brake pipe and thereby cause an emergency application of the brakes.

This passage is controlled by a check valve which operates to cut off the flow of fluid therethrough from the brake pipe to the pressure chamber, and a by-pass passage extending around the check valve is provided through which fluid may be supplied to the pressure chamber from the brake pipe at a restricted rate. As fluid is supplied to the pressure chamber only at a restricted rate the pressure in the pressure chamber will not increase as rapidly as the pressure in the brake pipe is increased, and sufficient differential in pressure will be developed between the brake pipe and the pressure chamber to move the abutment to its inner release position in which communication is established between the brake cylinder and the brake pipe.

In the emergency valve device shown in the above identified application a ball type check valve is employed and it is moved to its seated position by fluid flowing from the brake pipe to the pressure chamber. There is a possibility, if the rate of increase in the pressure of the fluid in the brake pipe is relatively slow, as may be the case at the rear end of a long train, so that the rate of flow of fluid from the brake pipe to the pressure chamber is relatively slow, that the fluid flowing through this passage will not exert sufficient force on this ball check valve to move it to the seated position to restrict the flow of fluid from the brake pipe to the pressure chamber. As a result the pressure of the fluid in the pressure chamber will increase substantially as rapidly as the pressure of the fluid in the brake pipe and no pressure differential will be created to move the abutment to the inner release position.

It is an object of this invention to provide a brake controlling valve device operative to effect emergency applications of the brakes, and having a movable abutment subject to the opposing pressures of the fluid in the brake pipe and of the fluid in a pressure chamber, the abutment controlling a communication through which fluid under pressure may flow between the brake pipe and the pressure chamber, improved means being provided to restrict the rate of flow of fluid from the brake pipe to the pressure chamber through this passage.

A further object of the invention is to provide an emergency valve device of the type described and having improved valve means controlling a communication through which fluid flows between the brake pipe and the pressure chamber, this valve means being operative on movement of the abutment from the emergency application position towards the release position to restrict the rate of flow of fluid from the brake pipe to the pressure chamber.

Another object of the invention is to provide an emergency valve device of the type described and in which the valve means controlling the flow of fluid from the brake pipe to the pressure chamber is operative to restrict the rate of flow of fluid to the pressure chamber irrespective of the rate of increase in brake pipe pressure.

A further object of the invention is to provide an emergency valve device of the type described and having valve means to cut off the flow of fluid from the brake pipe to the pressure chamber on movement of the abutment from the emergency application position to the release position until a predetermined pressure has been established in the brake pipe, a valve device being provided to also control a communication between the brake pipe and the pressure chamber and being operative to close said communication before the valve means is operative to open the communication controlled thereby.

Another object of the invention is to provide an improved device for controlling emergency applications of the brakes.

Other objects of the invention and features of novelty will be apparent from the following description taken in connection with the accompanying drawing, the single figure of which is a diagrammatic view, largely in section, of a brake equipment embodying this invention.

Referring to the drawing, the brake equipment therein illustrated comprises a brake pipe 1, a brake cylinder 2, an emergency reservoir 4, and a brake controlling valve device indicated generally by the reference numeral 5.

The brake controlling valve device 5 comprises a pipe bracket section 7 having a mounting face thereon against which is secured the emergency valve portion 8 provided by this invention, while the pipe bracket section 7 has another mounting face thereon, not shown, against which is secured the service portion, not shown, of the brake controlling valve device.

The emergency valve portion 8 provided by this invention is an improvement on the corresponding emergency valve portion of the brake controlling valve device shown and claimed in the U. S. Patent No. 2,031,213, to Clyde C. Farmer, and only such portions of the construction and operation of the valve device are illustrated and described in this application as are essential to the understanding of this improvement.

The emergency valve portion 8 comprises a body having a bore therein in which is mounted a movable abutment in the form of a piston 10 having at one side thereof a chamber 12, which is connected by way of a passage 13 in the pipe bracket section 7 with a branch pipe 14, which communicates with the brake pipe 1. The piston 10 has at the other side thereof a valve chamber 16 in which is mounted a main slide valve 18, and an auxiliary slide valve 20, which are operated by the piston 10 through a stem 22 formed integral with the piston. The valve chamber 16 is connected by way of a passage 15 with a pressure chamber 17 formed in the pipe bracket section 7.

The stem 22 has a bore in the end thereof in which is mounted a plunger 24, which is yieldingly pressed against the end of the main slide valve 18 by means of a spring 26.

The end of the valve chamber 16 is closed by means of a cover 28, and this cover has a bore therein in which is mounted a plunger 30, which is adapted to be engaged by a shoulder 32 on the piston stem 22, and by a projection 34 on the end of the main slide valve 18. The plunger 30 is yieldingly urged to the right, as viewed in the drawing, by means of a coil spring 36, while movement of the plunger in this direction is limited by engagement of the plunger with the body of the emergency portion.

The main slide valve 18 is held in engagement with its seat by means of a strut 38, which engages one face of a diaphragm 40. The other face of the diaphragm 40 is subject to the pressure of the fluid in a chamber 42, which is constantly connected by way of a passage and pipe 44 with the emergency reservoir 4. The diaphragm 40 is also subject to the pressure of a spring 46 which is mounted in the chamber 42.

The body of the emergency portion 8 has formed therein a chamber 60, which is constantly connected by a passage 62 with the passage 13 in the pipe bracket section 7, and thereby through the branch pipe 14 to the brake pipe 1. An accelerated release check valve 64 is mounted in the chamber 60 and is yieldingly urged by means of a spring 66 into engagement with a seat rib 68, while a ball check valve 70 is mounted in the chamber within the seat rib 68 and is adapted to engage a seat formed on the body 1 surrounding a passage 72 which communicates with a port in the seat of the main slide valve 18.

The body of the emergency portion 8 also has a bore therein in which is mounted a vent valve piston 76 having at one side thereof a chamber 78, which is constantly connected by way of a passage 80 with a port in the seat of the main slide valve seat 18.

The chamber on the other face of the piston 76 is open to the atmosphere by way of a passage 82, while the body has a groove 84 therein, which in one position of the piston 76 extends around the piston so as to permit communication between the chamber 78 and the chamber on the opposite face of the piston 76.

The piston 76 has a passage 86 extending therethrough so as to permit fluid to flow from the chamber 78 to the chamber on the opposite face of the piston, and thence to the atmosphere by way of the passage 82. The passage 86 has a choke 88 interposed therein to restrict the rate of flow of fluid from the chamber 78.

The body of the emergency valve portion has a groove formed therein adjacent the end of the bore in which the vent valve piston 76 is mounted. In this groove is secured a sealing gasket 90, having formed thereon an annular seat rib 92, which is adapted to be engaged by a face of the piston 76 to cut off communication from the chamber 78 around the periphery of the piston 76.

The piston 76 has formed integral therewith a stem 94, which has secured thereon a vent valve 96, which is mounted in a chamber 97 formed in the body of the emergency portion 8, and which is adapted to engage a seat rib 98 formed on the body of the emergency portion 8. The chamber 97 in which the vent valve 96 is mounted is connected by way of a passage 99 with the passage 62, and thereby with the passage 13 in the pipe bracket section 7 to which is connected the branch pipe 14 leading to the brake pipe 1, while the valve 96 is yieldingly urged by means of a spring 100 into engagement with the seat rib 98.

The emergency portion shown in the drawing has valve means indicated generally by the reference numeral 105 for controlling the supply of fluid under pressure from the brake pipe to the valve chamber 16 and the pressure chamber 17.

As shown in the drawing, the valve means 105 comprises a diaphragm 107, which is urged into engagement with a seat rib 109 by means of a spring 111 acting through a spring seat 113, which engages a face of the diaphragm. The spring 111 is mounted in a chamber 115 which is constantly connected with the atmosphere by way of a passage 117.

The chamber 119 within the seat rib 109 is constantly connected by way of a passage 121 with a port in the bore in the body of the valve portion in which the piston 10 is mounted. The passage 121 has a choke 123 interposed therein.

In the emergency valve portion provided by my invention a valve device is provided to control the rate of flow of fluid from the valve means 105 to the valve chamber 16 and pressure chamber 17. As shown in the drawing this valve device is indicated generally by the reference numeral 125, and comprises a movable abutment in the form of a diaphragm 127, which is subject on one side to the pressure of the fluid in a chamber 129, and on the other side to the pressure of the fluid in a chamber 131.

The chamber 129 is constantly connected by way of a passage 133 with the chamber 119 within the seat rib 109 of the valve means 105, while the body of the emergency portion 8 has projections 135 formed thereon which extend into the chamber 129 and are engaged by the diaphragm 127 to limit movement of the diaphragm in one direction.

The chamber 131 of the valve device 125 is constantly connected by way of a passage 137 with the slide valve chamber 16 and the pressure chamber 17, while a valve 139 is positioned in the chamber 131 and is yieldingly urged by means of a spring 141 away from a seat rib 143 surrounding a chamber 145, which is constantly connected by way of a passage 147 with the chamber 149 outwardly of the seat rib 109 of the valve means 105.

A passage 151, having a choke 153 interposed therein, communicates with the passage 147 and the passage 137.

The valve 139 is adapted to be moved to the seated position by means of the diaphragm 127 acting through a plunger 155 which engages one face of the diaphragm 127. The plunger 155 is slidable in a bore in a portion of the body of the emergency portion 8, and is provided with an enlarged head 157 which is adapted to engage shoulders 159 on the body to limit movement of the diaphragm 127 in one direction.

The plunger 155 has a bore therein in which is mounted a spring 161 and a spring seat 163, which carries a stem 165 which engages the valve 139. Movement of the spring seat 163 by the spring 161 is limited by engagement of the spring seat 163 with an inwardly extending flange 167 on the plunger 155.

The spring 161 provides yielding force transmitting means, whereby the valve 104 is held seated with a substantially constant pressure regardless of the extent of movement of the diaphragm 127. As will be understood, the spring 161 is proportioned so as to be able to transmit substantially greater force to the valve 139 than is exerted by the spring 141 so that the valve 139 may be moved to the seated position against the spring 141 by force transmitted through the spring 161.

The emergency valve portion provided by this invention is shown in the drawing in the normal release position, which is the position which it assumes when the brake equipment is fully charged. When the brake equipment is at atmospheric pressure the diaphragm 107 of the valve means 105 is held in engagement with the seat rib 109 by the spring 111, while the other parts of the emergency valve portion may be in the position in which they are shown in the drawing.

In initially charging the equipment, fluid under pressure is supplied to the brake pipe 1, and it flows therefrom through the branch pipe 14 to the passage 13 and to the chamber 12 on the face of the piston 10.

Fluid under pressure supplied to the passage 13 also flows to the service portion, not shown, of the brake controlling valve device 5, and causes the piston of this portion to move to the release position in which the brake cylinder 2 is connected to the atmosphere, and in which a communication is opened through which fluid under pressure may flow from the passage 13 to the auxiliary reservoir, not shown, and to the emergency reservoir 4 to charge these reservoirs with fluid under pressure.

Fluid under pressure supplied by the service portion of the brake controlling valve device to the emergency reservoir 4 flows by way of the passage 44 to the chamber 42 on the face of the diaphragm 40, and increases the force exerted through the stem 38 to maintain the main slide valve 18 in engagement with its seat.

Fluid under pressure supplied from the brake pipe 1 to the passage 13 flows therethrough to the chamber 12 on the face of the piston 10 of the emergency valve portion 8, and on an increase in the pressure of the fluid in this chamber the piston 10 will be moved to the left, as viewed in the drawing, to the normal release position, if it is not already in that position, which is the position in which it is shown in the drawing.

On movement of the piston 10 to the normal release position communication is opened between the chamber 12 and the passage 121 through the choke 123 and fluid under pressure will flow to the chamber 119 on the face of the diaphragm 107, which at this time is held in engagement with the seat rib 109 by the spring 111.

The spring 111 is of such value, and the chamber 119 within the seat rib 109 is of such area, that the diaphragm 107 is held in engagement with the seat rib 109 until the pressure of the fluid in the chamber 119 within the seat rib 109 has increased to a predetermined value, such as twelve pounds.

Fluid under pressure supplied to the chamber 119 flows therefrom by way of the passage 133 to the chamber 129 on the face of the diaphragm 127.

On a predetermined increase in the pressure of the fluid in the chamber 129 the diaphragm 127 is moved upwardly, as viewed in the drawing, thereby moving the plunger 155 upwardly, and this movement of the plunger 155 is transmitted through the spring 161 to the spring seat 163 to press the stem 165 against the valve 139 to move this valve against the spring 141 into engagement with the seat rib 143. On movement of the valve 139 to the seated position, and on further movement of the plunger 155, the spring 161 is compressed and the plunger 155 is moved relative to the spring seat 163. Movement of the plunger 155 in this direction is limited by the engagement of the head 157 of the plunger with the shoulders 159 on the body of the emergency valve portion 8.

The increase in the pressure of the fluid in the chamber 119 on the face of the diaphragm 107 will be accompanied by a similar increase in the pressure of fluid in the chamber 12 on the face of the piston 10, and the fluid under pressure in this chamber exerts a force on the piston 10 tending to move it to the left, as viewed in the drawing, to the normal release position, if it is not already in this position, so as to fully open the port through which the passage 121 communicates with the chamber 12.

Movement of the piston 10 farther to the left, as viewed in the drawing, from the normal release position towards the inner release position, is resisted by the spring 36 acting through the plunger 30, which is engaged by the shoulder 32 of the piston stem 22 and by the projection 34 on the end of the main slide valve 18. The various parts of the emergency valve portion are arranged, however, so that the spring 36 and the plunger 30 are not effective to oppose movement of the piston 10 in this direction until the piston 10 has moved to a position to completely open the port through which the passage 121 communicates with the chamber 12 on the face of the piston 10.

When the pressure of the fluid in the chamber 119 on the face of the diaphragm 107 has increased to a predetermined relatively high value, such as above twelve pounds, the force exerted by the fluid under pressure in the chamber 119 on the diaphragm 107 is sufficient to overcome the opposing force of the spring 111, and the diaphragm 107 will be moved away from the seat rib 109 so as to permit fluid under pressure to flow from the chamber 119 past the seat rib 109 to the chamber 149 outwardly of the seat rib 109.

As soon as the diaphragm 107 is moved away from the seat rib 109, and fluid under pressure is supplied to the chamber 149 outwardly of the seat rib 109, the entire area of the face of the diaphragm 107 is subject to the pressure of the fluid in the chambers 119 and 149, and the force exerted by this fluid under pressure on the diaphragm 107 will be substantially greater than that exerted by the fluid under pressure in the chamber 119 within the seat rib 109. As soon as the diaphragm 107 is moved away from the seat rib 109, therefore, there is a substantial increase in the force exerted by the fluid under pressure on this diaphragm, and the diaphragm is thereafter moved very quickly against the spring 111 until the spring seat 113 engages a portion of the body of the emergency valve portion 8 to prevent further movement of the diaphragm 107 against the spring 111.

On the supply of fluid under pressure to the chamber 149 outwardly of the seat rib 109 fluid flows therefrom by way of the passage 147 to the chamber 145 on the spring side of the valve 139. However, at this time the valve 139 is held in engagement with the seat rib 143 by the diaphragm 127 acting through the spring 161, and fluid under pressure cannot flow from the chamber 145 to the chamber 131.

Fluid under pressure supplied to the passage 147 flows to the passage 151 and through the choke 153 to the passage 137, through which it flows to the chamber 131 on the face of the diaphragm 127, and to the valve chamber 16 and the pressure chamber 17 to increase the pressure of the fluid in these chambers.

Fluid under pressure continues to flow from the chamber 12 on the face of the piston 10 through the choke 123 to the passage 121 leading to the chamber 119, and thence past the seat rib 109 to the chamber 149, and therefrom by way of the passage 147 and through the choke 153 to the passage 137 leading to the valve chamber 16 and the pressure chamber 17, and to the chamber 131, to increase the pressure of fluid in these chambers until the pressure therein has substantially equalized with the pressure of the fluid in chamber 12.

On an increase in the pressure of the fluid in the chamber 131 on the face of the diaphragm 127 there is an increase in the force exerted by the fluid in this chamber on the diaphragm 127 and opposing the force exerted by the fluid under pressure in the chamber 129 on the opposite face of the diaphragm 127. When the pressure of the fluid in the chamber 131 has increased approximately to the pressure of the fluid in the brake pipe, and consequently in the chamber 129 on the opposite face of the diaphragm 116, the force exerted by the fluid under pressure in the chamber 131, supplemented by the force exerted by the spring 161 acting through the plunger 155, will be sufficient to overcome the opposing force of the fluid under pressure in the chamber 129, and the diaphragm 127 will be moved downwardly, as viewed in the drawing, thereby permitting the spring 161 to expand.

The spring 161 will expand until the spring seat 163 engages the inwardly extending flange 167 on the plunger 155, and it will thereafter be ineffective to exert force on the diaphragm 127 and tending to move the diaphragm against the opposing force of the fluid under pressure in the chamber 129.

On a slight further increase in the pressure of the fluid in the chamber 131, which is at substantially the same pressure as the fluid in the chambers 16 and 17, the force exerted by the fluid under pressure in the chamber 131, supplemented by the force exerted by the spring 141 acting through the valve 139, will be sufficient to move the diaphragm 127 against the opposing force of the fluid under pressure in the chamber 129, and the diaphragm 127 will thereupon be moved downwardly into engagement with the projections 135, while the valve 139 will be moved away from the seat rib 143 by the spring 141 so as to permit fluid under pressure to flow from the chamber 145 to the chamber 131 at a rapid rate.

Fluid under pressure can now flow from the brake pipe to the valve chamber 16 and the pressure chamber 17 past the valve 139, as well as through the choke 153, so that the further charging of the valve chamber and the pressure chamber occurs at a rapid rate.

Upon a subsequent reduction in the pressure of the fluid in the brake pipe 1 at a service rate to effect a service application of the brakes, the service portion, not shown, of the brake controlling valve device operates, as described in detail in the above identified patent, to close the communication through which fluid under pressure is supplied from the brake pipe 1 to the auxiliary reservoir, not shown, and to the emergency reservoir 4. In addition, the service portion operates to supply fluid under pressure from the auxiliary reservoir to the brake cylinder 2 until the pressure of the fluid in the auxiliary reservoir is reduced substantially to the pressure at which the pressure in the brake pipe is reduced.

On a reduction in the pressure of the fluid in the brake pipe 1 at a service rate, fluid under pressure flows from the valve chamber 16 and the pressure chamber 17 to the chamber 12 on the face of the piston 10 by way of the passage 137 to the chamber 131, past the unseated valve 139 to the chamber 145, thence by way of the passage 147 to the chamber 149 outwardly of the seat rib 109, past this seat rib to the chamber 119 within the seat rib, and thence by way of the passage 121 and through the choke 123 to the chamber 12.

The choke 123 is proportioned to permit fluid under pressure to flow from the chambers 16 and 17 at a rate which enables the pressure of the fluid in these chambers to be reduced substantially as rapidly as the pressure of the fluid in chamber 12 on the face of the piston 10 is reduced during a reduction in brake pipe pressure at a service rate.

As the pressure of the fluid in the chambers 16 and 17 is reduced by the flow of fluid therefrom to the brake pipe substantially as rapidly as the pressure of the fluid in the chamber 12 is reduced during a reduction in the pressure of the fluid in the brake pipe at a service rate, no differential will be developed in the pressure of the fluid in the chambers on opposite sides of the piston 10, and the piston 10, therefore, will remain in the normal release position.

During service applications of the brakes the pressure of the fluid in the brake pipe is maintained at a substantial value, and the fluid under pressure in the chambers 119 and 149 acting on the face of the diaphragm 107 maintains the diaphragm 107 away from the seat rib 109 against the opposing force of the spring 111.

Since the diaphragm 127 of the valve device 125 is subject to the opposing pressures of the fluid in the chambers 131 and 129, which communicate with the valve chamber 16 and with the brake pipe 1, respectively, the valve 139 will be held away from the seat rib 143 by the spring 141 during a service reduction in brake pipe pressure because, as just described, the fluid pressure in the valve chamber 16 is reduced at substantially the same rate as the brake pipe pressure is reduced.

On a subsequent increase in the pressure of the fluid in the brake pipe to effect the release of the brakes, the service portion of the brake controlling valve device 5 operates as described in detail in the above identified patent, to release fluid under pressure from the brake cylinder 2, and to open a communication through which fluid under pressure is supplied from the brake pipe to the auxiliary reservoir, not shown, and to the emergency reservoir 4.

On this increase in the pressure of the fluid in the brake pipe there will be a similar increase in the pressure of the fluid in the chamber 12 on the face of the piston 10, and fluid under pressure will flow therefrom through the coke 123 to the passage 121, and therethrough to the chamber 119 on the face of the diaphragm 107 of the valve means 105.

Fluid under pressure supplied to the chamber 119 will flow therefrom by way of the passage 133 to the chamber 129 on the face of the diaphragm 127 to increase the pressure of the fluid in this chamber.

Fluid under pressure supplied to the chamber 119 also flows past the seat rib 109, as the diaphragm 107 is held away from this seat rib at this time, to the chamber 149 outwardly of the seat rib, and thence by way of the passage 147 to the chamber 145 and past the unseated valve 139 to the chamber 131, from which it flows by way of the passage 137 to the valve chamber 16 and the pressure chamber 17 to increase the pressure of the fluid in these chambers.

In addition, fluid under pressure supplied to the passage 147 will flow therefrom by way of the passage 151 and through the choke 153 to the passage 137 leading to the chambers 16 and 17.

As fluid under pressure can flow past the unseated valve 139 to the chamber 131, and thence to the chambers 16 and 17, it will flow to these chambers at a relatively rapid rate, and the rate of increase in the pressure of the fluid in these chambers will be substantially as rapid as the rate of increase in the chamber 12 on the opposite face of the piston 10. As a result, substantially no differential will be created in the pressure of the fluid in the chambers on opposite sides of the piston 10 during this increase in the pressure of the fluid in the brake pipe, and substantially no force will be exerted on the piston 10 tending to move it to the left, as viewed in the drawing. The piston 10, therefore, will not be moved to the inner release position, but will remain in the normal release position.

On an increase in the pressure of the fluid in the chambers 16 and 17 there will be a similar increase in the pressure of the fluid in the chamber 131 of the valve device 125, so that the pressure of the fluid in the chamber 131 will be increased substantially as rapidly as the pressure of the fluid in the chamber 129 on the opposite face of the diaphragm 127. As a result there will be substantially no force exerted through the diaphragm 127 tending to move the valve 139 to the seated position against the spring 141, and this valve will be maintained away from the seat rib 143 by the spring 141 to permit fluid under pressure to flow to these chambers 16 and 17 at a rapid rate.

On a reduction in the pressure of the fluid in the brake pipe 1 at an emergency rate to effect an emergency application of the brakes, the service portion, not shown, of the brake controlling valve device 5 operates as described in detail in the above identified patent to close the communication through which fluid under pressure is supplied from the brake pipe 1 to the auxiliary reservoir, not shown, and to the emergency reservoir 4, and to supply fluid under pressure from the auxiliary reservoir to the brake cylinder 2.

When the brake pipe pressure is reduced at an emergency rate, there will be a back flow of fluid from the valve chamber 16 of the emergency portion 8 to the brake pipe by way of the passage 137 and through the choke 123 as in a service reduction in brake pipe pressure, but since the brake pipe pressure is now being reduced at an emergency rate, the pressure on the brake pipe side of the piston will reduce more rapidly than the pressure in the valve chamber 16 can reduce by flow through the restricted passage or choke 123, and, as a result, a differential pressure is created in the valve chamber 16 which causes the piston 10 and the auxiliary slide valve 20 to be shifted relative to the main slide valve 18 against the opposing force of the spring 26 acting through the plunger 24.

On this movement of the piston 10 and the stem 22 relative to the main slide valve 18, the auxiliary slide valve 20 is moved relative to the main slide valve 18 so as to uncover a port 170 through the main slide valve 18, which communicates with the passage 80 leading to the chamber 78 on the face of the vent valve piston 76. When the auxiliary slide valve 20 is moved to a position to uncover the port 170 through the main slide valve 18, fluid under pressure from the chamber 16 flows through the port 170 to the passage 80 and therethrough to the chamber 78 on the face of the vent valve piston 76. The rate of flow of fluid under pressure through the passage 80 to the chamber 78 is substantially more rapid than the rate at which fluid under pressure may escape from the chamber 78 through the groove 84 around the piston 76, and through the choke 88 in the passage 86. As a result, there will be a rapid increase in the pressure of the fluid in the chamber 78 and the vent valve piston 76 will be moved to the right, as viewed in the drawing, and this movement of the piston 76 will be transmitted through the stem 94 to move the vent valve 96 away from the seat rib 98 against the opposing force of the spring 100 and of the fluid under pressure in the chamber 97.

On this movement of the piston 76, the face of the piston is moved into engagement with the seat rib 92 on the gasket 90 so as to prevent the escape of fluid under pressure from the chamber 78 around the periphery of the piston.

On movement of the vent valve 96 away from the seat rib 98 a relatively large opening is provided through which fluid under pressure supplied from the brake pipe 1 by way of the branch pipe 14 and the passages 13, 62 and 99 to the chamber 97 will escape to the atmosphere by way of the atmospheric passage 82. There will, therefore, be a rapid reduction in the pressure of the fluid in the brake pipe 1, and also in the chamber 12 on the face of the piston 10, as this chamber communicates with the passage 13, and the piston 10 and the stem 22 will be rapidly moved to the right, as viewed in the drawing, by the higher pressure of the fluid under pressure in the chamber 16.

The piston 10 and the stem 22 are moved to the right, as viewed in the drawing, until the face of the piston engages the face of the gasket 172, which is clamped between the emergency portion 8 and the pipe bracket section 7. This is the emergency application position of the piston 10.

On movement of the piston 10 and the stem 22 a short distance towards the application position, a shoulder 174 on the piston stem 22 engages the end of the main slide valve 18, so that on further movement of the piston 10 and the stem 22 towards the application position, the main slide valve 18 is moved upon its seat and uncovers the end of the passage 80 so as to permit fluid under pressure in the chamber 16 to continue to flow to the passage 80 and therethrough to the chamber 78 on the face of the vent valve piston 76.

Upon movement of the piston 10 to the emergency application position, the main slide valve 18 is moved so that a cavity 176 therein establishes communication between a port in the seat of the slide valve to which is connected the passage 44 leading from the emergency reservoir 4, and a passage 178 leading to the brake cylinder 2, so that fluid under pressure will now flow from the emergency reservoir 4 to the brake cylinder 2.

Fluid under pressure supplied to the chamber 78 at the face of the vent valve piston 76 will be vented therefrom at a restricted rate through the choke 88 and the passage 86 through the piston 76. The volume of the chambers 16 and 17, and the rate of flow of fluid under pressure through the choke 88, are proportioned so as to maintain the pressure of the fluid in the chamber 78 at a value sufficient to hold the piston 76 in engagement with the rib 92 against the opposing force of the spring 100, and thereby hold the vent valve 96 away from the seat rib 98 until the pressure of the fluid in the brake pipe 1 has been reduced substantially to atmospheric pressure.

When the pressure of the fluid in the chamber 78 has been reduced to a relatively low value by the venting of fluid under pressure therefrom through the choke 88 and the passage 86, the force exerted by this fluid on the piston 76 is insufficient to maintain this piston against the opposing force of the spring 100 acting through the vent valve 96 and the stem 94, and the spring 100 will thereupon move the vent valve 96 into engagement with the seat rib 98, while the piston 76 will be moved away from the seat rib 92 to the position in which it is shown in the drawing, in which position the groove 84 extends around the piston 76. When the piston 76 is moved to this position any fluid under pressure remaining in the chambers 16 and 17, and in the chamber 78 at the face of the piston 76, can escape therefrom at a rapid rate through the groove 84 around the piston 76, and thence to the atmosphere by way of the passage 82. The chambers 16 and 17, therefore, will be reduced substantially to atmospheric pressure.

On movement of the piston 10 to the application position, the passage 121 is in communication with the chambers 16 and 17 so that the pressure of the fluid in the chambers 119 and 149 at the face of the diaphragm 107 reduces as the pressure of the fluid in the pressure chamber reduces, and when the pressure on the diaphragm 107 has been reduced sufficiently, the diaphragm will be moved downwardly by the spring 111 into engagement with the seat rib 109.

In addition, the pressure of the fluid in the chambers 129 and 131 on the opposite sides of the diaphragm 127 of the valve device 125 will reduce as the pressure in the chambers 16 and 17 reduces, and, as the pressure on the opposite sides of the diaphragm 127 is substantially equal, the valve 139 will be held away from the seat rib 143 by the spring 141, while the diaphragm 127 will be held in engagement with the projections 135.

On a subsequent increase in the pressure of the fluid in the brake pipe 1 to effect a release of the brakes, fluid under pressure flows therefrom by way of the branch pipe 14 to the passage 13 and to the chamber 12 on the face of the piston 10.

When the pressure of the fluid in the chamber 12 has increased to a predetermined relatively low value, the force exerted by this fluid under pressure on the piston 10, together with the force exerted by the spring 26 acting through the piston stem 22, is sufficient to cause the piston 10 to be moved away from the gasket 172, if it has not already been moved away from the gasket by the spring 26 acting alone. On this movement of the piston 10, the stem 22 and the auxiliary slide valve 20 are moved relative to the main slide valve 18, and the auxiliary slide valve 20 is moved to a position to cover the end of the passage 170 through the main slide valve 18.

As the piston 10 moves towards the normal release position the main slide valve 18 is moved to cut off communication between the passages 44 and 178 by way of the cavity 176, so that communication between the emergency reservoir 4 and the brake cylinder 2 is cut off.

In addition, on this movement of the main slide valve 18, the end of the slide valve covers the end of the passage 80 to cut off communication between the valve chamber 16 and the passage 80, while the slide valve 18 is moved to a position in which the port 170 therethrough communicates with the passage 80.

After a certain amount of movement of the piston 10 it will be moved to a position to open communication between the chamber 12 and the port through which fluid under pressure is supplied from the chamber 12 through the choke 123 to the passage 121 leading to the chamber 119 on the face of the diaphragm 107 of the valve means 105. Fluid under pressure thus supplied to the chamber 119 will then flow therefrom through the passage 133 to the chamber 129 on the face of the diaphragm 127 of the valve device 125, and on a predetermined increase in the pressure of the fluid in the chamber 129 the diaphragm 127 will be forced upwardly, and its movement will be transmitted through the plunger 155 and the spring 161 to the spring seat 163, and through the stem 165 to the valve 139 to move this valve into engagement with the seat rib 143 against the opposing force of the spring 141.

Fluid under pressure supplied from the brake pipe 1 through the passage 121 acts on the area of the diaphragm 107 within the seat rib 109, and when the brake pipe pressure has been increased to a predetermined degree sufficient to overcome the pressure of the spring 111, the diaphragm 107 will be moved from its seat so as to open communication from the brake pipe to the valve chamber 16 by way of the restricted port or choke 153.

The choke 153 is of much smaller flow capacity than the choke 123, and is proportioned so as to permit fluid to flow therethrough only at a relatively slow rate, and as a result there will be a relatively slow increase in the pressure of the fluid in the chambers 16 and 17, and in the chamber 131 of the valve device 125.

During the release of the brakes after an emergency application of the brakes, the pressure of the fluid in the brake pipe is increased at a relatively rapid rate. This rapid increase in brake pipe pressure, especially at the head end of the train is sufficient to cause movement of the piston 10 to its inner release position against the resistance of the spring 36, and the slide valve 18 is moved to a position in which the cavity 176 therein establishes communication between the passage 178 and the passage 72.

Upon movement of the main slide valve 18 to this position, fluid under pressure will flow from the brake cylinder 2 and the auxiliary reservoir, not shown, by way of the pipe and passage 178, and the cavity 176 in the main slide valve 18, to the passage 72, and through this passage past the ball check valve 70 to the chamber within the seat rib 68. On an increase in the pressure of the fluid in the chamber within the seat rib 68 the accelerated release check valve 64 will be moved away from the seat rib 68 against the opposing force of the spring 66, and of the fluid under pressure in the chamber 60, and fluid under pressure will flow to the chamber 60 and thence by way of the passage 62 to the passage 13, which communicates with the chamber 12 on the face of the piston 10, and with the branch pipe 14 leading to the brake pipe 1, so as to increase the pressure of the fluid in the brake pipe and in the chamber 12.

The fluid under pressure thus supplied to the brake pipe causes a local increase in brake pipe pressure at each car which is transmitted serially throughout the train so as to insure movement of the pistons 10 of the emergency portions of the brake controlling valve devices to their inner release positions.

When the pressure of the fluid in the brake cylinder 2 and the auxiliary reservoir, not shown, and in the brake pipe 1 has substantially equalized by the flow of fluid under pressure from the brake cylinder and the auxiliary reservoir to the brake pipe, the accelerated release check valve 64 is moved into engagement with the seat rib 68 by the spring 66 so as to cut off the further flow of fluid under pressure from the brake cylinder to the brake pipe, and to prevent back flow of fluid under pressure from the brake pipe to the cylinder 2.

If for any reason the increase in the pressure of the fluid in the brake pipe is not sufficient to immediately cause movement of the piston 10 to the inner release position against the spring 36, as may occur at the rear of a long train, or in a train which includes a number of cars equipped with older types of brake controlling valve devices, the valve device 125 operates to insure movement of the piston 10 to the inner release position.

The pressure of the fluid in the brake pipe and in the chamber 12 on the face of the piston 10 will increase more rapidly than the pressure of the fluid in the chamber 16 is increased by the flow of fluid thereto from the brake pipe through the choke 153. As a result there will be a gradually increasing differential between the pressure of the fluid in the chambers 12 and 16 on the opposite sides of the piston 10, and a corresponding gradual increase in the force tending to move the piston 10 against the resistance of the spring 36. When this differential has increased to a predetermined amount the force exerted on the piston 10 is great enough to move it against the spring 36, and the piston and the slide valve 18 will thereupon be moved to the inner release position.

During the time that the piston 10 and the main slide valve 18 are in the inner release position, fluid under pressure continues to flow from the chamber 12 through the choke 153 to the chambers 16 and 17, and to the chamber 131 of the valve device 125, and after a time interval the pressure of the fluid in the chambers 16 and 17 will have increased to a value such that the force exerted on the piston 10 by the fluid under pressure in the chamber 16, together with the force exerted by the spring 36 acting through the plunger 30, is sufficient to overcome the opposing force exerted on the piston 10 by the fluid under pressure in the chamber 12. The piston 10 and the main slide valve 18 will thereupon be moved by the spring 36 acting through the plunger 30, and by the fluid under pressure in the chamber 16 acting on the piston 10, to the right, as viewed in the drawing, from the inner release position to the normal release position. The plunger 30 is able to move the main slide valve 18 at this time as the plunger 30 is engaged by the projection 34 on the main slide valve.

When the piston 10 and the main slide valve 18 have been moved to the normal release position, the plunger 30 engages a portion of the body of the emergency portion 8 which prevents further movement of the plunger 30 with the result that the spring 36 is no longer effective to exert force on the piston 10 and the stem 22, or on the main slide valve 18, and the higher pressure of the fluid in the chamber 12 on the face of the piston 10 prevents further movement of the piston 10 by the fluid under pressure in the valve chamber 16.

The rate of flow of fluid under pressure through the choke 153 is such that the pressure of the fluid in the chambers 16 and 17 will not have increased to a value sufficient to cause the piston 10 and the main slide valve 18 to move from the inner release position to the normal release position until after the piston 10 and the main slide valve 18 have been in the inner release position for a period of time long enough to permit the fluid under pressure from the brake cylinder 2 and in the auxiliary reservoir, not shown, to flow to the brake pipe 1 and substantially equalize the pressure of the fluid in the brake cylinder and auxiliary reservoir and in the brake pipe.

After movement of the piston 10 to the normal release position, fluid under pressure continues to flow from the chamber 12 through the choke 123 to the passage 121 and thence to the chamber 119, from which it flows past the seat rib 109 to the chamber 149, and therefrom by way of the passage 147 to the passage 151, and through the choke 153 to the passage 137 leading to the chambers 16 and 17.

In addition, fluid under pressure supplied to the passage 137 flows to the chamber 131 on one side of the diaphragm 127 of the valve device 125, while the diaphragm 127 is subject on the other side to the pressure of the fluid in the chamber 129. The chamber 129 is connected by way of the passage 133 with the chamber 119, which communicates with the chamber 12, and thereby with the brake pipe 1 through the passage 121 and the choke 123, which is of relatively large flow capacity. The pressure of the fluid in the chamber 129, therefore, will be at substantially the pressure of the fluid in the chamber 12.

When the pressure of the fluid in the chamber 131 has increased to a value such that the difference between the pressure of the fluid in the chamber 131, and in the chamber 129 on the opposite face of the diaphragm 127, is less than the predetermined amount, the spring 161 will expand and move the diaphragm 127 and the plunger 155 downwardly until the spring seat 163 engages the inwardly extending flange 167 on the plunger 155.

On a further reduction in the differential between the pressure of the fluid in the chamber 131, and in the chamber 129, the spring 141 will move the valve 139 downwardly away from the seat rib 143, and this movement of the valve 139 will be transmitted through the stem 165 and the spring 161 to move the diaphragm 127 into engagement with the projections 135.

After movement of the valve 139 away from the seat rib 143, fluid under pressure supplied to the passage 147 flows to the chamber 145 and then past the seat rib 143 to the chamber 131, and therefrom by way of the passage 137 to the chambers 16 and 17 to increase the pressure of fluid in these chambers at a relatively rapid rate until the pressure of the fluid in these chambers has equalized with the pressure of the fluid in the chamber 12, and in the brake pipe 1.

On an increase in the pressure of the fluid in the brake pipe 1 fluid under pressure flows therefrom by way of the branch pipe 14 and the passages in the pipe bracket section 7 to the service portion, not shown, of the brake controlling valve device 5, and when the pressure of the fluid supplied from the brake pipe 1 to the service portion has increased to a value exceeding the pressure of the fluid in the auxiliary reservoir, the service portion operates, as described in detail in the above identified patent, to release fluid under pressure from the brake cylinder 2, and to open a communication through which fluid under pressure may be supplied from the brake pipe 1 to the auxiliary reservoir, not shown, and to the emergency reservoir 4.

It will be seen that the rate of flow of fluid from the brake pipe to the valve chamber 16 of the emergency portion 8 and the pressure chamber 17 is controlled by the valve device 125, and that this valve device incorporates a diaphragm for operating the valve employed therein for restricting the flow of fluid to the chambers 16 and 17. This diaphragm may be of substantial area so that adequate force is available to insure movement of the valve to the closed position.

It will be seen also that during a release of the brakes after an emergency application of the brakes, fluid under pressure is supplied to the chamber on the face of this diaphragm before fluid is supplied to the passage leading to the chambers 16 and 17, with the result that the valve device 125 is operated to restrict the flow capacity of the passages leading to the chambers 16 and 17 before any fluid is supplied to these chambers. This insures that the rate of increase in the pressure of the fluid in the chambers 16 and 17 will be restricted so that sufficient pressure differential will be developed on opposite sides of the piston 10 to cause the piston to move to the inner release position, and to remain in this position for a substantial period of time.

It will be further seen that fluid under pressure is not supplied to the valve chamber 16 until a predetermined pressure has been developed in the brake pipe, and that the chamber at the face of the diaphragm of the valve device 125 is supplied with fluid under pressure from the brake pipe, so that a substantial differential in pressure is developed on opposite sides of this diaphragm to move the valve operated thereby to the seated position. This differential is developed even though the rate of increase in brake pipe pressure is relatively slow, as no fluid is supplied to the valve chamber until a predetermined pressure is built up in the brake pipe.

In addition, it will be seen that the valve device 125 incorporates a spring through which force is transmitted from the diaphragm to the valve employed therein. This spring serves to limit the amount of force transmitted to the valve from the diaphragm, and prevents the valve being pressed against its seat with too great force, which might result in injury to the valve.

While one embodiment of the improved brake controlling valve device provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake, in combination, a brake pipe, and an emergency valve device comprising a movable abutment subject to the opposing pressures of the fluid in the brake pipe and in a pressure chamber and controlling a communication through which fluid under pressure may flow between the pressure chamber and the brake pipe, valve means subject to the opposing pressures of the fluid in the pressure chamber and in an operating chamber for controlling the flow of fluid through said communication, said valve means being operative on an increase in the pressure of the fluid in said operating chamber to restrict the flow of fluid through said communication, and means for supplying fluid under pressure from the brake pipe to said operating chamber.

2. In a fluid pressure brake, in combination, a brake pipe, and an emergency valve device comprising a movable abutment subject to the opposing pressures of the fluid in the brake pipe and in a pressure chamber and controlling a communication through which fluid under pressure may flow between the pressure chamber and the brake pipe, valve means subject to the opposing pressures of the fluid in the pressure chamber and in an operating chamber for controlling the flow of fluid through said communication, said valve means being operative on an increase in the pressure of the fluid in said operating chamber to restrict the flow of fluid through said communication, and means controlled by said abutment for supplying fluid under pressure from the brake pipe to said operating chamber.

3. In a fluid pressure brake, in combination, a brake pipe, and an emergency valve device comprising a movable abutment subject to the opposing pressures of the fluid in the brake pipe and in a pressure chamber and controlling a communication through which fluid under pressure may flow between the pressure chamber and the brake pipe, valve means subject to the opposing pressures of the fluid in the pressure chamber and in an operating chamber for controlling the flow of fluid through said communication, said valve means being operative on an increase in the pressure of the fluid in said operating chamber to cut off the flow of fluid through said communication, means for supplying fluid under pressure from the brake pipe to said operating chamber, and a by-pass passage extending around said valve means through which fluid may flow from the brake pipe to the pressure chamber at a restricted rate.

4. In a fluid pressure brake, in combination, a brake pipe, and an emergency valve device comprising a movable abutment subject to the opposing pressures of the fluid in the brake pipe and in a pressure chamber and controlling a communication through which fluid under pressure may flow between the pressure chamber and the brake pipe, valve means subject to and operated on an increase in the pressure of the fluid supplied to said communication from the brake pipe to open communication therethrough, a valve device subject to the opposing pressures of the fluid in the pressure chamber and of the fluid in an operating chamber for controlling the flow of fluid between the pressure chamber and said valve means, and means for supplying fluid under pressure from the brake pipe to said operating chamber.

5. In a fluid pressure brake, in combination, a brake pipe, and an emergency valve device comprising a movable abutment subject to the opposing pressures of the fluid in the brake pipe and in a pressure chamber and controlling a communication through which fluid under pressure may flow between the pressure chamber and the brake pipe, valve means subject to and operated on an increase in the pressure of the fluid supplied to said communication from the brake pipe to open communication therethrough, a valve device subject to the opposing pressures of the fluid in the pressure chamber and of the fluid in an operating chamber for controlling the flow of fluid between the pressure chamber and said valve means, and means controlled by said abutment for supplying fluid under pressure from the brake pipe to said operating chamber.

6. In a fluid pressure brake, in combination, a brake pipe, an emergency valve device comprising a movable abutment subject to the opposing pressures of the fluid in the brake pipe and in a pressure chamber and controlling a communication through which fluid under pressure may flow between the brake pipe and the pressure chamber, valve means subject to and operated on a predetermined increase in the pressure of the fluid supplied from the brake pipe to said communication to open communication therethrough, a valve device subject to the opposing pressures of the fluid in the pressure chamber and in an operating chamber for controlling the rate of flow of fluid through said communication, and means for supplying fluid under pressure from the brake pipe to said operating chamber.

7. In a fluid pressure brake, in combination, a brake pipe, an emergency valve device comprising a movable abutment subject to the opposing pressures of the fluid in the brake pipe and in a pressure chamber and controlling a communication through which fluid under pressure may flow between the brake pipe and the pressure chamber, valve means subject to and operated on a predetermined increase in the pressure of the fluid supplied from the brake pipe to said communication to open communication therethrough, a valve device subject to the opposing pressures of the fluid in the pressure chamber and in an operating chamber for controlling the rate of flow of fluid through said communication, and means controlled by said abutment for supplying fluid under pressure from the brake pipe to said operating chamber.

8. In a fluid pressure brake, in combination, a brake pipe, a brake cylinder, valve means movable to a back-dump position to supply fluid from the brake cylinder to the brake pipe, yielding means opposing movement of the valve means to said back-dump position, a movable abutment subject to the opposing pressures of the fluid in the brake pipe and in a pressure chamber for operating said valve means and for controlling a communication through which fluid may flow between the brake pipe and the pressure chamber, a valve device subject to the opposing pressures of the fluid in the pressure chamber and of the fluid in an operating chamber for controlling the flow of fluid from the brake pipe to the pressure chamber through said communication, and means for supplying fluid under pressure from the brake pipe to said operating chamber.

9. In a fluid pressure brake, in combination, a brake pipe, a brake cylinder, valve means movable to a back-dump position to supply fluid from the brake cylinder to the brake pipe, yielding means opposing movement of the valve means to said back-dump position, a movable abutment subject to the opposing pressures of the fluid in the brake pipe and in a pressure chamber for operating said valve means and for controlling a communication through which fluid may flow between the brake pipe and the pressure chamber, a valve device subject to the opposing pressures of the fluid in the pressure chamber and of the fluid in an operating chamber for controlling the flow of fluid from the brake pipe to the pressure chamber through said communication, and means controlled by said abutment for supplying fluid under pressure from the brake pipe to said operating chamber.

10. In a fluid pressure brake, in combination, a brake pipe, a brake cylinder, valve means movable to a back-dump position to supply fluid from the brake cylinder to the brake pipe, yielding means opposing movement of said valve means to the back-dump position, a movable abutment subject to the opposing pressures of the fluid in the brake pipe and in a pressure chamber for operating said valve means and for controlling a communication through which fluid may flow between the brake pipe and the pressure chamber, valve means subject to and operated on a predetermined increase in the pressure of the fluid supplied from the brake pipe to said communication to open communication therethrough, a valve device subject to the opposing pressures of the fluid in the pressure chamber and of the fluid in an operating chamber for controlling the rate of flow of fluid through said communication, and means for supplying fluid from the brake pipe to said operating chamber.

11. In a fluid pressure brake, in combination, a brake pipe, a brake cylinder, valve means movable to a back-dump position to supply fluid from the brake cylinder to the brake pipe, yielding means opposing movement of said valve means to the back-dump position, a movable abutment subject to the opposing pressures of the fluid in the brake pipe and in a pressure chamber for operating said valve means and for controlling a communication through which fluid may flow between the brake pipe and the pressure chamber, valve means subject to and operated on a predetermined increase in the pressure of the fluid supplied from the brake pipe to said communication to open communication therethrough, a valve device subject to the opposing pressures of the fluid in the pressure chamber and of the fluid in an operating chamber for controlling the rate of flow of fluid through said communication, and means controlled by said abutment for supplying fluid from the brake pipe to said operating chamber.

12. In a fluid pressure brake, in combination, a brake pipe, and an emergency valve device comprising a movable abutment subject to the opposing pressures of the fluid in the brake pipe and of the fluid in a pressure chamber, valve means responsive to and operated on a predetermined increase in the pressure of the fluid supplied thereto to supply fluid under pressure to the pressure chamber, a valve device subject to the opposing pressures of the fluid in the pressure chamber and of the fluid in an operating chamber for controlling the rate of supply of fluid to the pressure chamber by said valve means, and means controlled by said abutment for supplying fluid under pressure from the brake pipe to said operating chamber and to said valve means.

13. In a fluid pressure brake, in combination, a brake pipe, an emergency valve device comprising a movable abutment subject to the opposing pressures of the brake pipe and of a pressure chamber, a valve device subject to the opposing pressures of the pressure chamber and of fluid supplied from the brake pipe for controlling a communication through which fluid under pressure is supplied from the brake pipe to the pressure chamber, valve means operated by fluid supplied thereto for controlling a communication through which said valve device supplies fluid under pressure from the brake pipe to the pressure chamber, and means controlled by said abutment for supplying fluid from the brake pipe to said valve means.

14. In a fluid pressure brake, in combination, a brake pipe, an emergency valve device comprising a movable abutment subject to the opposing pressures of the brake pipe and of a pressure chamber, a valve device subject to the opposing pressures of the pressure chamber and of fluid supplied from the brake pipe for controlling a communication through which fluid under pressure is supplied from the brake pipe to the pressure chamber, and valve means operated upon a predetermined increase in brake pipe pressure for opening a communication to permit the flow of fluid from the brake pipe to said valve device.

15. In a fluid pressure brake, in combination, a brake pipe, an emergency valve device comprising a movable abutment subject to the opposing pressures of the brake pipe and of a pressure chamber, a valve device subject to the opposing pressures of the pressure chamber and of fluid supplied from the brake pipe for controlling a communication from a passage to said pressure chamber, and valve means operated on a predetermined increase in brake pipe pressure for supplying fluid under pressure from the brake pipe to said passage.

16. In a fluid pressure brake, in combination, a brake pipe, an emergency valve device comprising a movable abutment subject to the opposing pressures of the brake pipe and of a pressure chamber, a valve device subject to the opposing pressures of the pressure chamber and of fluid supplied from the brake pipe for controlling a communication from a passage to said pressure chamber, and valve means operated on a predetermined increase in brake pipe pressure for supplying fluid under pressure from the brake pipe to said passage, said movable abutment controlling the supply of fluid from the brake pipe to said valve means.

17. In a fluid pressure brake, in combination, a brake pipe, an emergency valve device comprising a movable abutment subject to the opposing pressures of the fluid in a pressure chamber and of the fluid in the brake pipe, said abutment controlling a communication through which fluid under pressure may be supplied from the brake pipe to said chamber through a first restriction and through a second restriction of less flow area than the first, and a valve device subject to the opposing pressures of the pressure chamber and of fluid supplied from the brake pipe for controlling a by-pass around the second restriction.

18. In a fluid pressure brake, in combination, a brake pipe, an emergency valve device comprising a movable abutment subject to the opposing pressures of the fluid in a pressure chamber and of the fluid in the brake pipe, said abutment controlling a communication through which fluid under pressure may be supplied from the brake pipe to said chamber through a first restriction and through a second restriction of less flow area than the first, a valve device subject to the opposing pressures of the pressure chamber and of fluid supplied from the brake pipe for controlling a by-pass around the second restriction, and valve means operated upon a predetermined increase in brake pipe pressure for opening communication to permit the flow of fluid supplied through the first restriction to the second restriction.

19. In a fluid pressure brake, in combination, a brake pipe, and an emergency valve device subject to the opposing pressures of the fluid in the brake pipe and of the fluid in a pressure chamber, a passage controlled by said abutment through which fluid may flow in either direction between the brake pipe and the pressure chamber, said passage being adapted to permit fluid to flow from the pressure chamber to the brake pipe rapidly enough to reduce the pressure of the fluid in the pressure chamber substantially as rapidly as the pressure of the fluid in the brake pipe is reduced in effecting a service application of the brakes, and a valve device subject to the opposing pressures of the fluid in the pressure chamber and of fluid supplied from the brake pipe for controlling the rate of flow of fluid through said passage.

20. In a fluid pressure brake, in combination, a brake pipe, and an emergency valve device subject to the opposing pressures of the fluid in the brake pipe and of the fluid in a pressure chamber, a passage controlled by said abutment through which fluid may flow in either direction between the brake pipe and the pressure chamber, said passage being adapted to permit fluid to flow from the pressure chamber to the brake pipe rapidly enough to reduce the pressure of the fluid in the pressure chamber substantially as rapidly as the pressure of the fluid in the brake pipe is reduced in effecting a service application of the brakes, a valve device subject to the opposing pressures of the fluid in the pressure chamber and of fluid supplied from the brake pipe for controlling the rate of flow of fluid through said passage, and valve means operative on a predetermined increase in the pressure of fluid supplied from the brake pipe to said passage to open communication through said passage.

21. In a fluid pressure brake, in combination, a brake pipe, and an emergency valve device comprising a movable abutment subject to the opposing pressures of the fluid in the brake pipe and of the fluid in a pressure chamber, a communication controlled by said abutment through which fluid may be supplied from the brake pipe to the pressure chamber, valve means responsive to and operated on a predetermined increase in the pressure of the fluid supplied from the brake pipe to said communication to permit flow of fluid through said communication, and a valve device subject to the opposing pressures of the fluid in a chamber open to said communication and of the fluid in the pressure chamber for controlling the rate of supply of fluid from said communication to the pressure chamber.

HERBERT R. FUEHRER.